(12) United States Patent
Brenner

(10) Patent No.: US 6,553,636 B1
(45) Date of Patent: Apr. 29, 2003

(54) JEWELRY CLAMP

(75) Inventor: Lawrence I. Brenner, Norfolk, VA (US)

(73) Assignee: Spertner Jewelers, LLC, Norfolk, VA (US)

( * ) Notice: Subject to any disclaimer, the term of this patent is extended or adjusted under 35 U.S.C. 154(b) by 0 days.

(21) Appl. No.: 10/028,190

(22) Filed: Dec. 20, 2001

(51) Int. Cl.[7] .................. A44B 13/02; A44C 25/00; A45F 5/02; F16B 45/02
(52) U.S. Cl. .................... 24/599.6; 24/334; 24/510; 63/21
(58) Field of Search ............... 24/599.6, 334, 24/499, 500, 509, 510, 279; 63/21, 38

(56) References Cited

U.S. PATENT DOCUMENTS

| | | | |
|---|---|---|---|
| 1,853,387 A | | 4/1932 | Vetter |
| 2,874,435 A | * | 2/1959 | Nielsen ............. 24/598.5 |
| 3,914,828 A | * | 10/1975 | Noda ............... 24/504 |
| 3,956,804 A | * | 5/1976 | Gatof et al. ........ 24/598.5 |
| 4,411,050 A | * | 10/1983 | Couture ............ 24/598.5 |
| 4,924,562 A | | 5/1990 | Pogharian |
| 5,117,539 A | | 6/1992 | Shrader et al. |
| 5,479,795 A | | 1/1996 | Neri |
| 5,586,374 A | | 12/1996 | Nishida |
| 5,709,327 A | | 1/1998 | LaMacchia et al. |
| 5,832,571 A | * | 11/1998 | Kanamori .......... 24/599.6 |
| 5,934,526 A | | 8/1999 | Rosenbaum et al. |
| 6,088,884 A | | 7/2000 | Hentz |

* cited by examiner

Primary Examiner—Robert J. Sandy
(74) Attorney, Agent, or Firm—King & Schickli, PLLC

(57) ABSTRACT

A jewelry clasp has a base with a base end and a distal end with a hook extending back over the base. A jaw is moveably mounted with respect to the base adjacent a midpoint. A retainer portion of the jaw is adapted to overlie the top of the hook adjacent the distal end. A closed space is formed between the jaw, the hook and the base to receive an eyelet. A lever portion on the end of the jaw opposite the hook is provided to move the retainer portion outwardly in order to open the clasp. Preferably, a pivot pin mounts the jaw and a spring is utilized to urge the retainer portion firmly against the hook. The hook can have a straight section engageable by the eyelet during coupling and a curved section at the top of the hook. Particular angle positioning can provide additional assistance in coupling and decoupling the eyelet, along with the positioning, curving and spacing of the tip of the jaw. Alternatively, the hook may be curved substantially throughout its length.

9 Claims, 1 Drawing Sheet

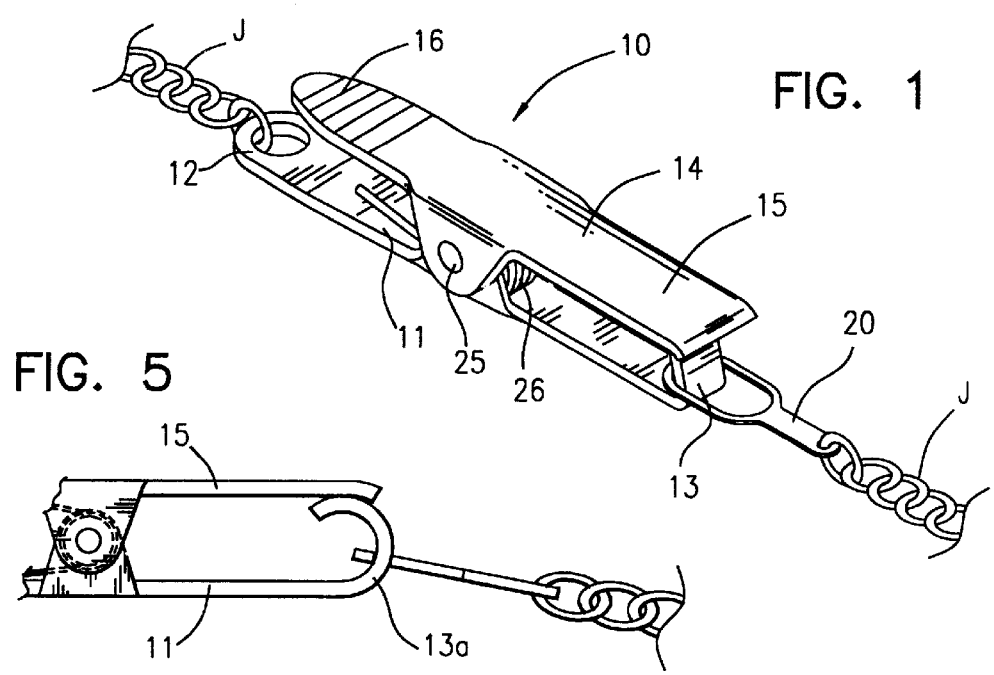
FIG. 1
FIG. 5
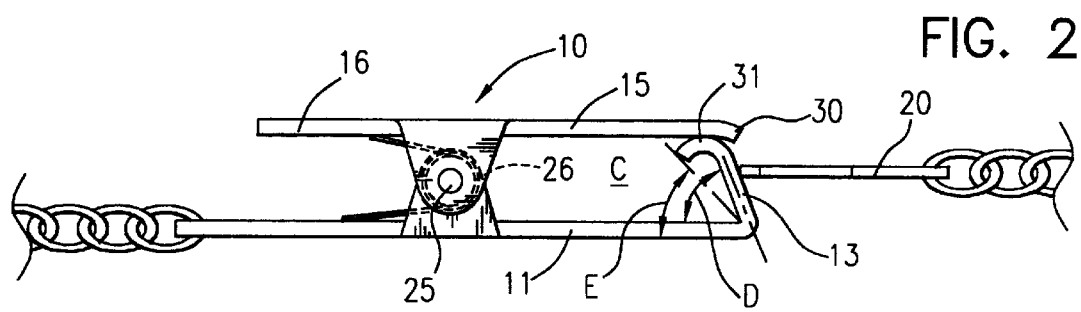
FIG. 2
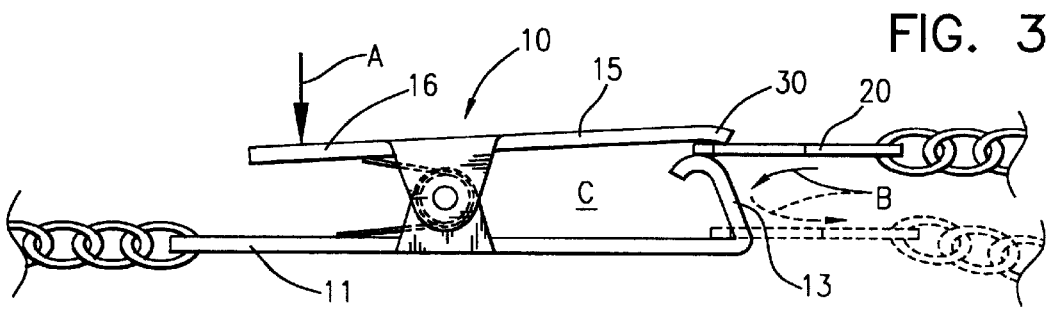
FIG. 3
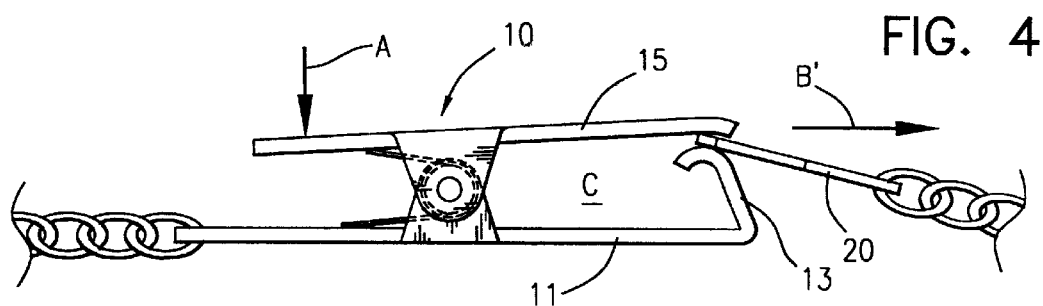
FIG. 4

JEWELRY CLAMP

BACKGROUND OF THE INVENTION

The present invention relates generally to the field of clasp or catch mechanisms used to couple the ends of flexible, elongated articles, and more particularly, the present invention relates to a clasp or catch adapted for use with jewelry pieces, such as chains, bracelets and necklaces.

Clasps used for coupling the opposite ends of such jewelry pieces, are by necessity small so that the mechanism will blend in with the piece. Another primary attribute of successful clasp mechanisms is that they must be secure when being worn, since the jewelry piece that is coupled by the clasp is usually very valuable. Another very important attribute of a successful clasp is that it be easily activated and coupled by the use of simple manual pressure. In this regard, it would be desirable to be able to eliminate the necessity for use of a fingernail. Ideally, an opening of the clasp by simple pressure between the thumb and first finger of a single hand would be most desirable. In other words, it should be able to be opened and closed by easy activation and controlled movement of a single element of the mechanism, but otherwise remain secure at all times when the jewelry piece is being worn. In addition, providing such a clasp or catch mechanism that can be successfully fabricated at a low cost is highly desirable.

The technology of jewelry at present does not fulfill all of these objectives, and are typified by three different approaches. One of the most popular clasps is known in the industry as the "lobster claw catch" and works on the principle of being able to move a small pin by engaging it's tip with the fingernail along a tubular body that in turn moves a keeper portion of a loop inwardly to receive or release an eyelet. While the clasp is small, to meet one of the three basic criteria, it is very difficult to operate since it does require a use of the fingernail. It is particularly difficult for elderly persons, as well as persons having even minor disabilities, such as arthritis or numbness in the hands. Attempts to improve on the lobster claw catch, have typically centered on eliminating the pin and replacing it with a relatively small button like actuator to move the retainer portion toward the inside of the loop. The patent to Neri, 5,479,795 is typical of this type of improvement effort. These clasps still tend to be difficult to operate with one hand and are generally considered not to blend well with the jewelry piece. In this regard, the lobster claw catches, including the so-called improvement catches, are positioned on their side when worn with the jewelry piece, such as around the neck or wrist. Thus, the protruding button portion, the exposed hook and the retainer element are considered unsightly and thus a detraction by most.

While the lobster claw catch is relatively complicated in construction, the other end of the spectrum of known clasps today comprise simple hook and eyelet mechanisms. The patent to Hentz 6,088,884 is typical of this approach. Like the lobster claw catch, this mechanism is unsightly since the hook will lie on its side when positioned around the neck or around the wrist of the jewelry wearer, but also it is sorely lacking in security since the hook or loop is open and depends solely upon the difference in thickness of the eyelet and the opening in the hook. In terms of simplicity but otherwise deficient, the clasp of the patent to Vetter 1,853,387 is of interest. The inwardly directly spring loop or tongue is relatively difficult to engage and requires considerable pressure to operate. The operation is essentially the same as employed in the '795 patent except the moveable member is a spring itself, rather than being a pivoted member.

Finally, the last of the three typical clasps that I am aware of is the tongue and box catch, as illustrated in the Pogharian patent 4,924,562. In this instance, the clasp operates in a manner similar to the '795 patent, and has a side activation button that protrudes out from the main body of the clasp. The clasp like the others lies on its side. It does incorporate an improvement over the open loop clasp in terms of blending with the jewelry piece in that the majority of the mechanism is enclosed in a separate box or housing. Because of the enclosure of the clasp in a box and the nature of the tongue required in lieu of a simple eyelet, the clasp tends to be large, and therefore also unsightly. Furthermore, because of its complicated construction, this particular clasp is generally considered the most expensive of all.

In view of the above-described prior art and others, it would thus be desirable to provide a new clasp or catch that is not only very small so that it does not detract from the jewelry piece upon which it is mounted, but also one that is very secure when worn and relatively simple in construction. The clasp of the present invention is to be user friendly to provide ease of opening and closing without the use of fingernails and instead utilizing simple digital pressure between the thumb and first finger of one hand. The attractiveness of the clasp of the invention should be enhanced by having the hook upstanding in its worn position around the neck or wrist rather than on its side where it is exposed. A jaw could be positioned to overlie and hide the hook in a unique fashion.

BRIEF SUMMARY OF THE INVENTION

In accordance with the invention, a jewelry clasp and eyelet assembly is provided that is user friendly, is attractive, is relatively simple in construction and low cost, as well as being very secure when used as a part of a jewelry piece. The clasp itself includes a base having a base end that is attached to an adjacent end of the jewelry piece, such as a necklace or bracelet. A distal end of the clasp is provided with a hook extending back over the base. A jaw is moveably mounted over the base and has a retainer portion adapted to overlie the top of the hook. The entire jaw covers the base in use so as to make the clasp as inconspicuous and thus blend with the jewelry piece as much as possible. The jaw when positioned over the hook forms a closed space with the base and the hook to capture an eyelet on the opposite end of the jewelry piece.

A lever portion on the opposite end of the jaw is provided for manual engagement in order to move the retainer portion outwardly away from the hook to open the clasp. By grasping the clasp between the thumb and first finger, it can be opened and closed easily. This form of activation, which does not require use of a fingernail, and which is not hindered by arthritis in the hand or other infirmities, is an important feature of the present invention. The lever portion is moved with a sense of ease and control that is not heretofore been available with other clasps.

When the clasp is opened by simply pressing the lever portion toward the base, the eyelet slips under the tip of the jaw, and thus down into the closed space to make the coupling. The simplicity of the operation is also applicable to the decoupling of the eyelet from the hook. Upon release of the simple pressure between the thumb and index finger of the lever portion, the clasp is at all times automatically closed. The jewelry piece resting by gravity maintains the eyelet securely engaged with the hook and the spring biased jaw portion serves as a keeper to provide additional security for the assembly. As is apparent, the structure of the clasp and eyelet assembly makes it easy to manufacture and assemble by stamping, and because there are also only a minimum number of parts that are necessary, the cost is minimized. The size of the clasp does, of course, depend on the particular jewelry piece to which that particular clasp is designed to be used, but the simplicity and relative low cost of manufacture applies to all.

In the preferred embodiment, the jaw is mounted for pivoting movement about a pivot pin adjacent a midpoint of the base, and the spring is a coil spring that extends around the pin to urge the retainer portion firmly against the top of the hook. Also, in a preferred embodiment, the hook has a substantially straight section extending at an acute angle to the base with the outer face being easily engageable by the eyelet for assistance in guiding to the top of the hook for coupling. The preferred angle is approximately 80° from the base. In this embodiment, a curved section forms the end of the hook and the inward extent of the curved section is at approximately 60° from the base. In accordance with an additional ancillary feature, the tip of the jaw at its distal end is curved and slightly spaced from the top of the jaw to assist during coupling of the eyelet with the hook.

In another embodiment of the clasp to illustrate the present invention, the hook is curved substantially throughout its length and extends to an angle of approximately 60° from the base.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

Still other attributes of the present invention will become readily apparent to those skilled in this art from the following description wherein there is shown and described in detail the preferred embodiment of this invention, simply by way of illustration of one of the best modes, as well as alternative embodiments, suited to carry out the invention. As it will be realized, the invention is capable of still other different embodiments, and its several details are capable of modifications in various, obvious aspects all without departing from the invention.

Accordingly, the drawing and descriptions will be regarded as illustrative in nature and not as restrictive.

BRIEF DESCRIPTION OF THE DRAWINGS

The accompanying drawing incorporated in and forming a part of the specification, illustrates several aspects of the present invention, and together with the description serves to explain the principles of the invention. In the drawings:

FIG. 1 is a perspective view of the clasp assembly of the present invention illustrated in a closed condition.

FIG. 2 is a side view of the clasp assembly of FIG. 1 illustrating the manner in which the eyelet can be brought up against the outer face of the hook as the coupling function is initiated;

FIG. 3 is a view from the side similar to FIG. 2, but illustrating the eyelet having been extended to the top of the hook, engaged under the tip of the retainer portion of the jaw, and with an action arrow sequence and dashed-line position showing the keeper in the coupled position with the eyelet seated at the bottom of the hook, such as during wearing of the attached jewelry piece around the neck or wrist;

FIG. 4 is also a side view and an illustration of the manner in which the clasp is easily decoupled by providing downward pressure against the lever portion, extending the eyelet up to the top of the clasp and sliding the eyelet outwardly across the tip of the jaw; and FIG. 5 is a side view similar to FIGS. 2–4, but showing the alternative embodiment with the hook curved along its entire length and the eyelet positioned in the coupled state.

Reference will now be made in detail to the present preferred embodiment of the invention, an example of which is illustrated in the accompanying drawing.

DETAILED DESCRIPTION OF THE INVENTION

With reference now in more detail to the drawing and the figures, the jewelry clasp 10 and eyelet assembly can be described with respect to the preferred embodiment, best mode and alternative embodiment, as presently envisioned. As broadly contemplated, the clasp 10 includes a base 11 having a base end 12 that is connected to a jewelry piece J, such as a chain. A distal end of the base 11 has a hook 13 that extends back over the base 11, as can best be seen in FIG. 2.

The clasp also includes a jaw 14 with retainer portion 15 that is moveably mounted with respect to the base 11 adjacent a midpoint. As illustrated in FIG. 2, the retainer portion 15 is positioned and adapted to overlie the top of the hook 13. In this manner, the jaw 14 in combination with the base 11 and the hook 13 forms a closed space, designated by the reference indicia C. A lever portion 16 on the opposite end of the jaw from the retainer portion 15 is provided to move the retainer portion outwardly away from the hook 13, in a manner that will be described in detail below.

An eyelet 20, that can best be visualized by viewing FIGS. 1 and 2 together, is connected to the opposite end of the jewelry piece J, so that once it is coupled with the clasp 10, the jewelry piece is held in position on the wearer, such as around the neck in the case of a necklace, or around the wrist in the case of a bracelet. In both cases, gravity acting through the jewelry piece J holds the eyelet 20 at the base of the hook, as shown in FIG. 1. For security, the retainer portion 15 of the clasp 10 by its positioning outside and on the top of the hook 13 serves to keep the eyelet 20 inside the closed space C, and thus fully secure against inadvertent release at all times.

To operate the clasp 10 and eyelet 20 assembly, reference can be made to FIG. 3. Simple downward pressure is applied, as denoted by the action arrow A, to the tip of the lever portion 15. This in turn raises the retainer portion 15 off of the top of the hook 13, and the eyelet 20 is simply introduced within the gap, as illustrated. The action arrow sequence B shows the manner in which the eyelet 20 easily slides into position within the space C and then can be reversed and positioned in the dashed-line position at the base of the hook 13. As shown in FIG. 4, when the jewelry piece J is to be no longer worn, the same simple downward pressure A is applied to raise the jaw portion 15, whereupon the eyelet 20 can be moved through a reverse sequence of FIG. 3 and removed from the closed space C, as illustrated by the reference arrow B'.

At this point of the description, it will be clear that the clasp 10 can be easily opened and closed, and without use of a fingernail or other undesirable manipulation; i.e. simply by moving the lever portion 16 toward the base 11. This controlled movement, that is well adapted to the use of the thumb and first finger of the hand, allows a person with arthritis or other hand infirmity to operate the jewelry/clasp assembly without pain and without outside assistance. Furthermore, the operation is such that the eyelet 20 is maintained securely coupled to the clasp 10 at all times during the wearing of the jewelry piece J.

In the best mode that is illustrated to show the details of the invention, and thus the preferred embodiment of the FIGS. 1–4, the mounting of the jaw 14 is provided by a pivot pin 25 adjacent the midpoint of the base 11. A coil spring 26 is positioned around the pin 25 so as to urge the jaw 14 to pivot downwardly toward the retainer portion 15 until it is stopped on top of the hook 13. It is the tension in the spring 26 that allows the eyelet 20 to remain within the space C, regardless of inadvertent extension or retraction of the eyelet 20 when the jewelry piece J is being worn.

The hook 13 is provided with a straight section extending at an acute angle D to the base 11. The outer face of the hook 13 extending in the upward direction serves to help guide the eyelet 20 into position for coupling. As illustrated in FIG. 2, as the eyelet 20 stops against the outer face, the person using the clasp 10 of the invention can be assisted, even by feel, in guiding by upward and inward movement toward the closed space C. In FIG. 3, the eyelet 20 is shown being captured under the tip 30, just as the eyelet 20 enters the closed space C. In this regard, as noted above, the action arrows B illustrate how the final coupling is made.

Preferably, the angle D that defines the slope of the straight section of the hook 13 is approximately 80° from the base 11. A curved section 31, which is actually the top of the hook 13 and forms the seat for the retainer portion 15 extends in a rearward arc back to the point defined by angle E. In this preferred embodiment, the rearward extent of the curved section 31 is at approximately 60°, as illustrated in FIG. 2.

As shown in FIG. 5, within the broad principles of the present invention, and as an alternative, the base 11 may include a hook 13a that is curved substantially throughout its length and extends to the same angle as the FIGS. 1–4 embodiment, or approximately 60°. The operation of the FIG. 5 embodiment is the same except for the assistance feature of guiding the eyelet 20 up along the outside face of the hook.

The user friendly manner in which the clasp 10 of the present invention is characterized will now be apparent to those with skill in the art. The lever portion 16 can be easily activated and controlled with the thumb and first finger of the user, rather than requiring some manipulation by the fingernail or the like. The ease of opening the clasp 10 is a big advantage to persons having difficulty with their hand manipulation, especially elderly persons or those with arthritis or numbness. The nature of the clasp 10 provides a better appearance and blends more favorably with the jewelry piece J, since the smooth jaw extends over the base and faces outwardly away from the neck or wrist. This is in contrast to the lobster claw catches and others that must be positioned on their side. Furthermore, the clasp 10 is made very secure so that the eyelet 20 is always retained within the hook 13, primarily by gravity of the jewelry piece J, but also keeping in mind the positioning of the retainer portion 15 holding against the top of the hook 13. The additional features of the clasp 14 provide for even better results and more advantages over the prior art. Finally, while being superior in performance and use, the clasp 14 and eyelet 20 assembly is characterized by relatively simple construction and low cost.

The foregoing description of the preferred clasp and assembly of the invention is presented for purposes of illustration and description. It is not intended to be exhaustive or to limit the invention to the precise form disclosed in the description, including the drawing. Obvious modifications or variations are possible in light of these teachings. The specific environment of the jewelry piece shown is chosen and described simply to provide the best illustration of the principles of the invention, as well as its practical application to the jewelry field. It is important to consider other various embodiments and modifications within the bounds of the attached claims that are suited to a particular use contemplated. In this respect, the appended claims will be interpreted in accordance with the breadth to which they are fairly, legally and equitably entitled.

What is claimed is:

1. A jewelry clasp and eyelet assembly comprising:
    a base forming the bottom of the clasp and having a base end, and a distal end with a hook extending up from and back over said base;
    a jaw movably mounted with respect to said base adjacent a mid-point and having a retainer portion adapted to overlie the top of said hook;
    said jaw forming a closed space with said base and said hook to thereby close said clasp;
    a lever portion on the opposite end of said jaw for moving the retainer portion outwardly and up away from said top of said hook to open said clasp; and
    an eyelet for introduction into said space for direct coupling with said hook,
    whereby the clasp can be opened and closed by easily activated and controlled movement of said lever portion toward and away from said base, and otherwise remain securely closed.

2. The jewelry clasp/eyelet assembly of claim 1, wherein said jaw is mounted for movement about a pivot pin and a spring around said pin urges said retainer portion firmly against said top of said hook.

3. The jewelry clasp/eyelet assembly of claim 1, wherein said hook has a substantially straight section extending at an acute angle to said base; the outer face of said straight section being engageable by said eyelet for assistance in guiding to the top of said hook and coupling with said hook.

4. The jewelry clasp/eyelet assembly of claim 3, wherein the acute angle of said straight hook section extends at approximately 80° from said base.

5. The jewelry clasp/eyelet assembly of claim 4, wherein said hook is provided with a curved section, forming the end of said hook, the end of said curved section extending to approximately 60° from the base.

6. The jewelry clasp/eyelet assembly of claim 1, wherein the distal end of the retainer portion of said jaw extends longitudinally beyond said hook, the tip of said distal end being curved and slightly spaced from the top of the jaw to engage said eyelet to assist during coupling with said hook.

7. The jewelry clasp/eyelet assembly of claim 1, wherein said hook is curved substantially throughout its length and extends to an angle of approximately 60° from said base.

8. The jewelry clasp/eyelet assembly of claim 1, wherein said jewelry clasp/eyelet assembly is provided an elongated jewelry piece connected at one end to the base end of said clasp and to said eyelet at the other end.

9. A jewelry clasp and eyelet assembly comprising:
    a base forming the bottom of the clasp and having a base end, and a distal end with a hook extending back over said base;

a jaw movably mounted with respect to said base adjacent a mid-point and having a retainer portion adapted to overlie the top of said hook;

said jaw forming a closed space with said base and said hook to thereby close said clasp;

a lever portion on the opposite end of said jaw for moving the retainer portion outwardly away from said hook to open said clasp; and an eyelet for introduction into said space for coupling with said hook;

said distal end of the retainer portion of said jaw extends longitudinally beyond said hook, the tip of said distal end being curved and slightly spaced from the top of the jaw to engage said eyelet to assist during coupling with said hook, whereby the clasp can be opened and closed by easily activated and controlled movement of said lever portion toward and away from said base, and otherwise remain securely closed.

* * * * *